Figure 1:
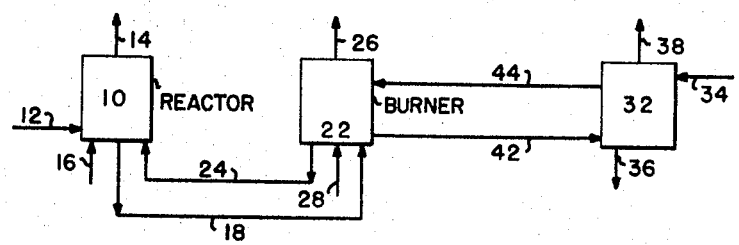

Oct. 18, 1966

W. J. METRAILER ETAL 3,280,021

FORMATION AND BAKING OF COKE AGGLOMERATES

Filed July 15, 1963

William Joseph Metrailer
Charles E. Jahnig   Inventors

By *George J Silhavy*

Patent Attorney 3,280,021
FORMATION AND BAKING OF COKE
AGGLOMERATES
William Joseph Metrailer, Baton Rouge, La., and Charles E. Jahnig, Rumson, N.J., assignors to Esso Research and Engineering Company, a corporation of Delaware
Filed July 15, 1963, Ser. No. 295,121
12 Claims. (Cl. 208—46)

This invention relates to the production of carbonaceous agglomerates or lumps from pitch and fine coke particles.

The known fluid coking process produces fine coke particles of a fairly narrow size range. For certain uses such as electrode manufacture or in the manufacture of carbon blocks and structural forms, or the like, a wider particle size range including sizes up to about one inch is desired.

The step of forming relatively large chunks, lumps or agglomerates comprises dropping pitch binder either as liquid droplets or in the form of solid particles into a quiescent fluid bed to agglomerate large particles which settle through the bed to crack the pitch binder and produce dense lumps of coke. Baking of the agglomerates is accomplished by the countercurrent flow of lumps and coke fines or finely divided coke.

Figure 2:
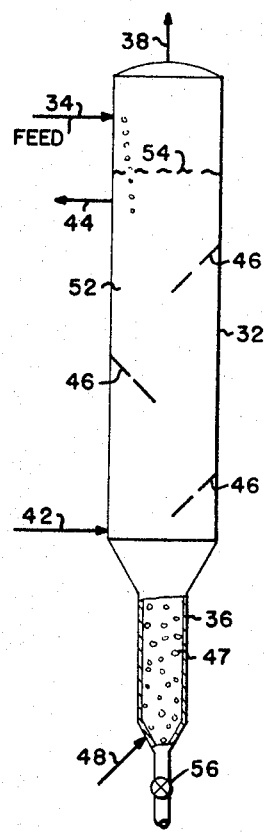

In the drawing:

FIG. 1 represents diagrammatically a fluid coking unit combined with an agglomerating unit; and FIG. 2 represents a longitudinal vertical cross section of one form of agglomerating vessel.

Referring now to the drawing, the reference character 10 designates a fluid coking reactor having a feed inlet line 12 for feeding residual oil such as heavy crudes, atmospheric and crude vacuum bottoms, asphalt, other heavy petroleum oil residual or mixtures thereof. Typically such oil feeds may have an initial boiling point of about 650° F. or higher, an API gravity of 0° to 20°, and a Conradson carbon residue content of about 5 to 40 wt. percent.

The temperature in the reactor 10 is between about 900° F. and 1100° F. to crack the oil to vapors and coke which collect on the coke particles in the dense fluidized turbulent bed in the reactor. Product vapors are taken overhead through line 14 and sent to a fractionator to separate or recover gas and light distillates therefrom. Steam is preferably added as fluidizing steam to the reactor 10 through line 16. The coke particles in the fluid bed reactor are of a size between about 44 and 1000 microns with most of the coke particles being between about 74 and 400 microns. The superficial velocity of the gaseous material passing up through fluid bed reactor 10 is between about 0.5 ft./sec. and 4.0 ft./sec. to produce a dense turbulent fluidized bed of coke particles in reactor 10.

The heat for carrying out the coking reaction is generated in a burner vessel. Coke particles are withdrawn from reactor 10, preferably steam stripped to remove oil vapors and then transferred through line 18 to burner 22. The burner 22 may be a transfer line burner or a fluid bed burner employing a standpipe and riser system diagrammatically shown with air being supplied to the riser for conveying the coke particles to the burner vessel. Sufficient coke particles or added carbonaceous material or fuel is burned in the burner vessel to heat the coke solids to a higher temperature than the solids in the reactor 10. The temperature in the burner vessel 22 is between about 1100° F. and 2200° F. The net coke production which represents the coke make less the coke burner is withdrawn as coke product. The hot coke particles are withdrawn from burner 22 through line 24 and returned through line 24 to reactor 10. Hot combustion gases pass overhead through line 26. Air is shown as being introduced into the lower portion of burner 22 through line 28.

To make agglomerates or chunks, pitch is introduced into the upper portion of agglomerating vessel 32 through line 34 for downward passage through a quiescent nonturbulent fluid bed of coke particles as will be presently described in greater detail in connection with FIG. 2. The agglomerates are withdrawn from the bottom of agglomerating vessel 32 through line 36. Cracked vapors pass overhead through line 38.

Hot coke particles from burner vessel 22 are transferred to the bottom of agglomerating vessel 32 through line 42. If necessary to supply necessary heat or fines concentration, coke particles from the upper portion of the quiescent fluid bed in vessel 32 may be withdrawn and returned to burner vessel 22 through line 44. If the hot coke particles from burner vessel are not hot enough for use in the agglemerating vessel 32, additional heat may be supplied to the coke particles from external heat sources or an oxygen-containing gas may be introduced into the vessel 32 to burn part of the coke and/or cracked hydrocarbon gases formed during the agglomeration step. Or heat may be supplied by circulating the fine coke particles to an external heat source.

Instead of using coke particles from the burner vessel, coke particles from any source may be used where the temperature of the coke is between about 1600° F. and 2800° F.

Referring now to FIG. 2, the agglomerating vessel 32 is shown as an elongated cylindrical vessel having a length to diameter ratio of at least 3:1 and preferably 10:1 or greater to minimize top to bottom mixing of the coke particles in the fluid bed. Baffles 46 are shown inclined downward from the inner wall of the vessel 32 at an angle greater than the angle of repose of the coke particles which is greater than about 30°. The baffles are preferably used to further reduce top to bottom mixing. The baffles 46 are shown as vertically spaced and arranged on opposite sides of the internal wall of vessel 32 to effect a general cascading flow and cause the agglomerates being formed to flow or pass down through the vessel 32 in a tortuous path. The baffles may be perforated to pass gas and coke fines upwardly but do not extend across the entire horizontal cross section of the vessel so that the agglomerates formed can flow across each baffle and down through the free area provided between the baffles.

Heated fine coke particles of a size between about 74 and 400 microns at a temperature between about 1100° F. and 2800° F. are fed through line 42 into the bottom of the elongated vessel 32 above the smaller section 36. A gas such as $H_2$, $H_2O$, $CH_4$ or $N_2$, singly or in combination, is introduced through line 48 into the bottom of the vessel 32 where the gas is in direct contact with the coarse agglomerates formed in vessel 32. The vessel 32 is formed at its bottom portion with a narrow or smaller diameter section 36 as shown in FIG. 2 where the large agglomerates 47 are collected after having been formed above in agglomerator 32. The gas from line 48 is used to strip out or elutriate fines from the lumps or agglomerates and also to cool the lumps or agglomerates. At the same time the gas is preheated.

The quantity of gas introduced through line 48 is just sufficient to give a superficial velocity of about 0.10 to 0.6 ft./sec. at the top of the bed 52 of coke particles maintained in the vessel 32. The fluid bed has a level indicated at 54. The superficial velocity of the gas at the top of bed 52 is maintained at a point of incipient fluidization (not turbulent dense fluidized bed). The superficial velocity may vary with coke particle size, fluidizing gas composition, etc., and may vary between 10 and 80% above the velocity given and can be established for the operating condition chosen to have a quiescent non-turbulent fluid bed. The low superficial velocity is maintained to minimize top to bottom mixing in the bed 52, but it must be sufficiently high to permit settling of the agglomerates formed. The superficial velocity in the lower portion of vessel 32 is less critical. However, if necessary, the diameter of the vessel 32 may be changed by making it of larger or smaller diameter as needed to provide the superficial velocity needed for continued settling of the coarse agglomerates with minimum backmixing of the fine coke particles, normally about 0.1 to 1.5 ft./sec. The formed larger agglomerates are withdrawn from the narrowed down section 36 of vessel 32 and removed by a star feeder 56 or the like at the lower end of section 36. The temperature in the upper part of section 36 of vessel 32 is between about 1600° F. and 2800° F. The removed agglomerates are cooled to between 400° F. and 900° F. by controlling the amount and type of cooling gases introduced through line 48.

The agglomerates are formed from the coke particles in the fluid bed 52 by dropping pitch from line 34 onto the surface 54 of fluid bed 52 in vessel 32. The pitch may be dropped in the form of liquid droplets or in the form of solid particles. The top portion of the bed 52 in the region of the top baffle 46 is maintained at a temperature between about 800° F. and 1000° F. and the temperature at the bottom portion of bed 52 below or in the region of bottom baffle 46 is maintained between about 1100° F. and 2800° F.

The pitch feed may be at a temperature between about 70° F. and 600° F. and may be derived from a petroleum source or a coal tar source. The pitch feed or binder should have a Conradson carbon content of at least 25 wt. percent and preferably above 40 wt. percent. The pitch feed may be treated by oxidation or with chemical additives to promote the quantity of residual carbon deposited from the pitch or pitch binder upon cracking in the quiescent fluid bed 52. Fine carbon, such as fine fluid coke, carbon black, etc., smaller than about 150 microns and preferably smaller than 75 microns may be included in the pitch binder up to 50 wt. percent. This may be particularly useful if pitch stocks containing a sufficiently high Conradson carbon content are not available.

When the pitch feed particles contact the hot coke particles in the bed 52, they cause localized defluidization in the bed and a number of coke particles from the bed are bound together by the pitch particles as they settle down through the fluid bed 52 where they encounter increasing temperatures and the pitch feed or binder cracks to produce coke or carbon and gas and the coke particles are bound together by the coke so formed to form larger agglomerates than the pitch feed particles. The gas passes up through the bed 52 and is recovered overhead through line 38 with fluidizing gas introduced through line 48.

As the agglomerates settle through the fluid bed 52, they encounter increasingly higher temperatures and they are baked to approximately the temperature of the incoming coke particles introduced through line 42.

Where pitch droplets or particles at a temperature of about 500° F. and of a size of about 2000 microns are introduced at the top of fluid bed 52 of about 25 feet deep and a diameter of about 10 feet, where the temperature is about 925° F., agglomerates are formed. The agglomerates are formed in a once-through operation; there is no recycle of agglomerates. The size increase of the pitch particles fed in through line 34 and the agglomerates 47 withdrawn from section 36 may be between about 3 and 20 times by weight. As the agglomerates pass down through the bed, the fluid bed temperature increases to about 1800° F. and formed agglomerates of a size of about 10,000 microns are separated and withdrawn from bottom section 36 of vessel 32. By varying the conditions, different sizes of agglomerates may be formed. The pitch feed particles may be between about 800 and 3000 microns and with the temperature in upper portion of bed 52 at between about 800° F. and 1000° F. and in the lower portion of bed 52 at a temperature between about 1600° F. and 2800° F. and with the coke particle size in bed 52 between about 74 and 400 microns, agglomerates of a size between 2,400 and 24,000 microns will be produced and collected in section 36.

In a specific example, the vessel 32 is 30 feet long and has a diameter of 3 feet. The bed 52 is about 21 feet long from inlet line 42 to level 54. The length to diameter ratio is about 7:1. Hot fine coke particles of a size between about 74 and 400 microns at a temperature of about 1800° F. are introduced through line 42 into the bottom portion of fluid bed 52 where the temperature is maintained at about 1600° F. The superficial velocity of the gases passing up through the bed 52 is about 0.2 ft./sec. to maintain a non-turbulent quiescent fluid bed 52 with little or no top to bottom mixing of coke particles of the bed 52.

Pitch feed which comprises a pitch binder having a gravity of 1.2° API and Conradson carbon content of 32 is introduced at a particle size of about 800 microns and at a temperature of about 500° F. and as a liquid through line 34 at a rate of about 2000 lbs./hr. onto the bed 52 which contains about 3.5 tons of coke particles. When the pitch particles contact the hot coke particles of the bed 52, they cause localized defludidization of the bed 52 and a number of coke particles from the bed are bound together or clustered together by the pitch.

Then as these agglomerates bound together by pitch settle through the fluid bed 52 they encounter increasing temperatures and the pitch cracks off leaving coke particles bound together by residual carbon or coke obtained from the cracking of the binder. The agglomerates of a size larger than about 2000 microns and in an amount of about 4000 lbs./hr. are collected in section 36 from which they are removed by star feeder, screw, or the like, 56 and cooled by steam entering line 48. Resulting agglomerates have a mercury displacement density of about 1.3 gm./cc. and a volatile content of less than 1 wt. percent. The pitch cracks quickly after it enters the fluid bed 52 and does not reach section 36 as pitch.

In order to maintain the temperature in fluid bed 52, it is necessary to supply heat and this may be done by withdrawing finely divided coke particles from the top of the fluid bed 52 through line 44, heating them in a conventional furnace or in burner vessel 22 and then returning the heated coke particles to the bottom of the bed 52 through line 42.

As the formation of the agglomerates consumes coke from the bed 52, it is necessary to add finely divided coke particles and to maintain the level 54 of the bed 52 substantially constant by the addition of finely divided coke. Coke made by processes other than the fluid coking process may be used in this invention, or coal can also be used to agglomerate iron, iron ore, minerals, etc.

One way to incorporate the fine carbon into the pitch binder is to heat the pitch binder to about 200° F. above the softening point of the pitch binder to liquefy the binder. The fine carbon in the desired amount is added to the liquefied binder and stirred or mixed in the liquefied binder. The pitch binder is then used as the feed for making the agglomerates.

The pitch binder may be selected from coal tar pitch, petroleum pitches, pitches from other carbonaceous products and have a softening point between about 130° F. and 260° F.

What is claimed is:

1. A method of producing larger coke agglomerates from relatively small pitch particles and finely divided coke particles produced in a fluid coking process and having a size up to about 1000 microns, which comprises maintaining a cylindrical quiescent non-turbulent fluid bed of said finely divided coke particles by passing a gas upwardly through said fluid bed at a superficial velocity between about 0.10 and 0.6 feet/second in the upper portion of said fluid bed, said fluid bed having a length to diameter ratio of at least 3:1 and maintained at a temperature above about 800° F. in its upper portion and a higher temperature above about 1600° F. in its lower portion, introducing relatively small pitch particles onto the top of said quiescent non-turbulent fluid bed to cause agglomeration of coke particles from said bed on said pitch particles to form larger agglomerated pitch particles in a once-through step without recycling, passing the agglomerated pitch particles down through the bottom portion of said quiescent non-turbulent fluid bed to crack the pitch and form larger coke agglomerates, supplying heated fine coke particles to the bottom portion of said quiescent fluid bed to supply heat to said bed and to replenish coke particles in said bed and withdrawing larger coke agglomerates from the bottom portion of said fluid bed.

2. A method of producing larger coke agglomerates from relatively small pitch particles and finely divided coke particles which comprises maintaining a quiescent non-turbulent fluid bed of finely divided coke particles of a size below about 1000 microns, said fluid bed having a length to diameter ratio of at least 3:1 to minimize top to bottom mixing of said coke particles and having its upper portion maintained at a temperature between about 800 and 1000° F., introducing pitch particles onto the surface of said quiescent non-turbulent fluid bed to cause binding together of a number of coke particles from said fluid bed by each pitch particle to form a lump or cluster, passing the lumps or clusters down through said quiescent non-turbulent fluid bed where the temperature of said bed is increased to between about 1600° F. and 2800° F. in a once-through step without recycling to crack off the pitch and form agglomerates bound together by the residual carbon obtained from cracking the pitch, collecting larger coke agglomerates at the bottom of said quiescent non-turbulent fluid bed and withdrawing said larger coke agglomerates from the method as product.

3. A method of producing larger coke agglomerates from relatively small pitch particles and finely divided coke particles which comprises maintaining a quiescent non-turbulent fluid bed of finely divided coke particles of a size below about 1000 microns by passing a gas upwardly through said fluid bed at a superficial velocity between about 0.10 and 0.6 feet/second in the upper portion of said fluid bed, said fluid bed having a length to diameter ratio of at least 3:1 to minimize top to bottom mixing of said coke particles and having its upper portion maintained at a temperature above about 800° F., introducing pitch particles onto the surface of said quiescent non-turbulent fluid bed to cause binding together of a number of coke particles from said fluid bed by each pitch particle to form a lump or cluster, passing the lumps or clusters in a once-through step without recycling down through said quiescent non-turbulent fluid bed where the temperature of said bed is increased to above about 1600° F. to crack off the pitch and form agglomerates bound together by the residual carbon obtained from cracking the pitch, collecting larger coke agglomerates at the bottom of said quiescent non-turbulent fluid bed and withdrawing said larger coke agglomerates from the method as product.

4. A method according to claim 1 wherein said pitch particles include admixed fine carbon particles smaller than about 150 microns and up to about 50 weight percent of said pitch particles.

5. A method according to claim 1 wherein the larger withdrawn coke agglomerates have a size at least 3 times by weight that of the pitch particles introduced into said quiescent fluid bed.

6. A method according to claim 1 wherein the formed agglomerates are separated from finely divided coke particles by elutriating gas which is thereby preheated and then used as fluidizing gas for the quiescent fluid bed.

7. A method of producing larger coke agglomerates from relatively small pitch particles which comprises maintaining a quiescent non-turbulent fluid bed of finely divided coke particles of a size between about 74 and 400 microns, said fluid bed having a length to diameter ratio of at least 10:1 and having its upper portion maintained at a temperature between about 800 and 1000° F., introducing solid pitch particles onto the surface of said quiescent fluid bed to cause localized defluidization of said fluid bed and a number of coke particles from said fluid bed are bound together by each pitch particle to form a lump or cluster, passing the lumps or clusters down through said quiescent fluid bed where the temperature of said bed is increased to between about 1600° F. and 2800° F. to crack off the pitch and form agglomerates bound together by the residual carbon obtained from cracking the pitch, collecting larger coke agglomerates at the bottom of said quiescent fluid bed and withdrawing said larger coke agglomerates from the method as product.

8. A method according to claim 7 wherein said pitch particles are caused to take a tortuous path through said quiescent fluid bed and larger coke agglomerates are formed in a once-through operation.

9. A method according to claim 7 wherein the larger withdrawn agglomerates have a size at least 3 times by weight that of the pitch particles.

10. A method according to claim 7 wherein said pitch particles contain added fine carbon particles.

11. A method according to claim 7 wherein fine carbon particles smaller than about 150 microns are admixed with the softened pitch binder from which the pitch binder particles are formed.

12. A method according to claim 7 wherein said pitch binder has a softening point between about 130° F. and 260° F.

References Cited by the Examiner
UNITED STATES PATENTS

| | | | |
|---|---|---|---|
| 2,709,676 | 5/1955 | Krebs | 208—127 |
| 2,734,852 | 2/1956 | Moser | 208—127 |
| 2,734,853 | 2/1956 | Smith et al. | 208—127 |
| 2,789,085 | 4/1957 | Rollman | 202—14 |
| 2,854,397 | 9/1958 | Moser | 208—127 |
| 2,879,221 | 3/1959 | Brown | 208—127 |
| 2,895,904 | 7/1959 | Jones et al. | 208—127 |

FOREIGN PATENTS

| | | |
|---|---|---|
| 746,813 | 3/1956 | Great Britain. |

DELBERT E. GANTZ, *Primary Examiner.*

ALPHONSO D. SULLIVAN, *Examiner.*

H. LEVINE, *Assistant Examiner.*